May 24, 1949.  C. E. PATTERSON  2,471,118
DETACHABLE ENGINE MOUNT AND ACCESSORY COUPLING
Filed Dec. 11, 1943  3 Sheets-Sheet 1

Chas. E. Patterson INVENTOR.
BY James M. Clark
His Patent Attorney

May 24, 1949.  C. E. PATTERSON  2,471,118
DETACHABLE ENGINE MOUNT AND ACCESSORY COUPLING
Filed Dec. 11, 1943  3 Sheets-Sheet 2

Chas. E. Patterson INVENTOR.
BY James M. Clark
His Patent Attorney

May 24, 1949.                C. E. PATTERSON                2,471,118
             DETACHABLE ENGINE MOUNT AND ACCESSORY COUPLING
Filed Dec. 11, 1943                                 3 Sheets-Sheet 3

Chas. E. Patterson  INVENTOR.
BY
His Patent Attorney

Patented May 24, 1949

2,471,118

UNITED STATES PATENT OFFICE 2,471,118

DETACHABLE ENGINE MOUNT AND ACCESSORY COUPLING

Charles E. Patterson, Pacific Palisades, Calif., assignor to North American Aviation, Inc., Inglewood, Calif., a corporation of Delaware Application December 11, 1943, Serial No. 513,934

6 Claims. (Cl. 244—54)

The present invention relates to the support of power plants and their accessories and more particularly to improvements in detachable engine mount and fluid fittings for aircraft and other vehicles.

Many problems have been presented by the necessity for removing aircraft and vehicular power plants and the fluid lines extending thereto from the interior of the body or fuselage. Such removal may be necessary either for repair or adjustment, or in certain cases for complete replacement. The removal of the engine and the accessory plumbing is often necessary in the field where sufficient and proper service facilities, tools and help are not always readily available. Such field servicing and removal is frequently required in military aircraft, tanks, trucks and the like where the element of time is also important in order to place the equipment back into service as soon as possible.

The design requirements of aircraft power plants and the arrangement of their accessories is such that the installation has to be relatively compact for complete enclosure within the streamlined cowling, the engine mount support structure must be such that the stresses are properly distributed to the fuselage or wing nacelle structure frequently with the provision of resilient mounting elements of a nature to arrest the power plant vibrations and prevent their transmission to the fuselage. Also the numerous fluid connections extending through the firewall are required to be run directly and in as short lines as possible and be provided with disconnect couplings or fittings which are quickly detachable and readily accessible to the service mechanic.

It is accordingly a major object of the present invention to provide a combined unitary fitting which is preferably separable at the firewall and which provides the necessary structural attachment between the engine mount and the fuselage or nacelle structure as well as the coupling elements for the fluid piping or plumbing lines carried from the airplane through the firewall to the engine or its accessory. It is a further object to provide in such a combined attachment device, quickly detachable couplings for the fluid connections and to arrange the same such that they are automatically and simultaneously disconnected at the time the engine mount is also disconnected. A further object resides in the provision of self-sealing fluid connections in such a device.

It is a further object to provide in combination with an engine mount, a fire wall attaching joint which is capable of simultaneously providing for the attachment of the engine mount and a plurality of tubular lines connecting the engine and the airplane. It is also an object to provide an engine mount fitting in which the tubular lines passing through the fire wall are automatically connected or disconnected as the engine mount is attached or detached. It is a corollary object of the present invention to provide an engine mount arranged such that when the structural attachment fittings are connected they automatically cause the connection and sealing of a plurality of fluid tubular lines carrying liquids or gases between the engine and the airplane. It is a further object to provide such a combined structural and fluid attachment which can be attached and detached by simple rectilinear or push-pull movements and retained by a single threaded fastening means.

Further objects of the present invention reside in the novel combination and arrangement of the elements in the combined engine mount and fluid coupling attachment fittings shown and described. Further objects and advantages will become apparent to those skilled in the art after a reading of the following specification taken together with the accompanying drawings forming a part hereof in which like numerals are employed to designate like parts throughout the same.

Figures 1, 2:
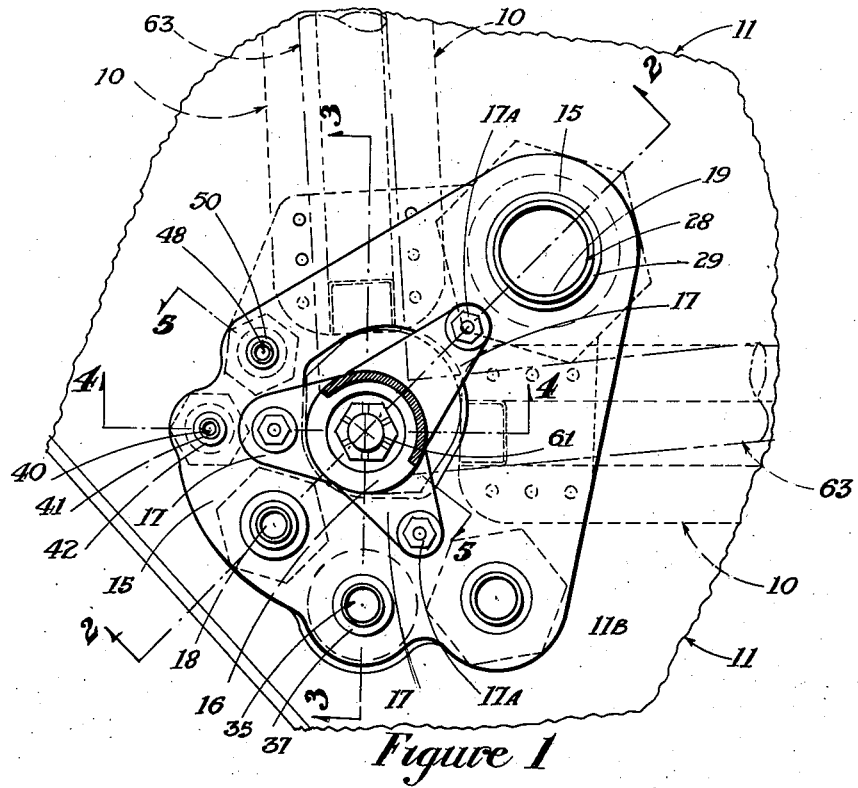
Figure 1 is an elevational view looking from the engine side showing a plate fitting at an engine firewall including an engine mount fitting and a plurality of tubular line couplings, and forms a preferred modification of this invention.
Figure 2 is a cross-section taken at 2—2 of Figure 1 showing the method of attaching the engine mount fitting and the tubular lines at the engine fire-wall.
Figures 3, 4, 5:
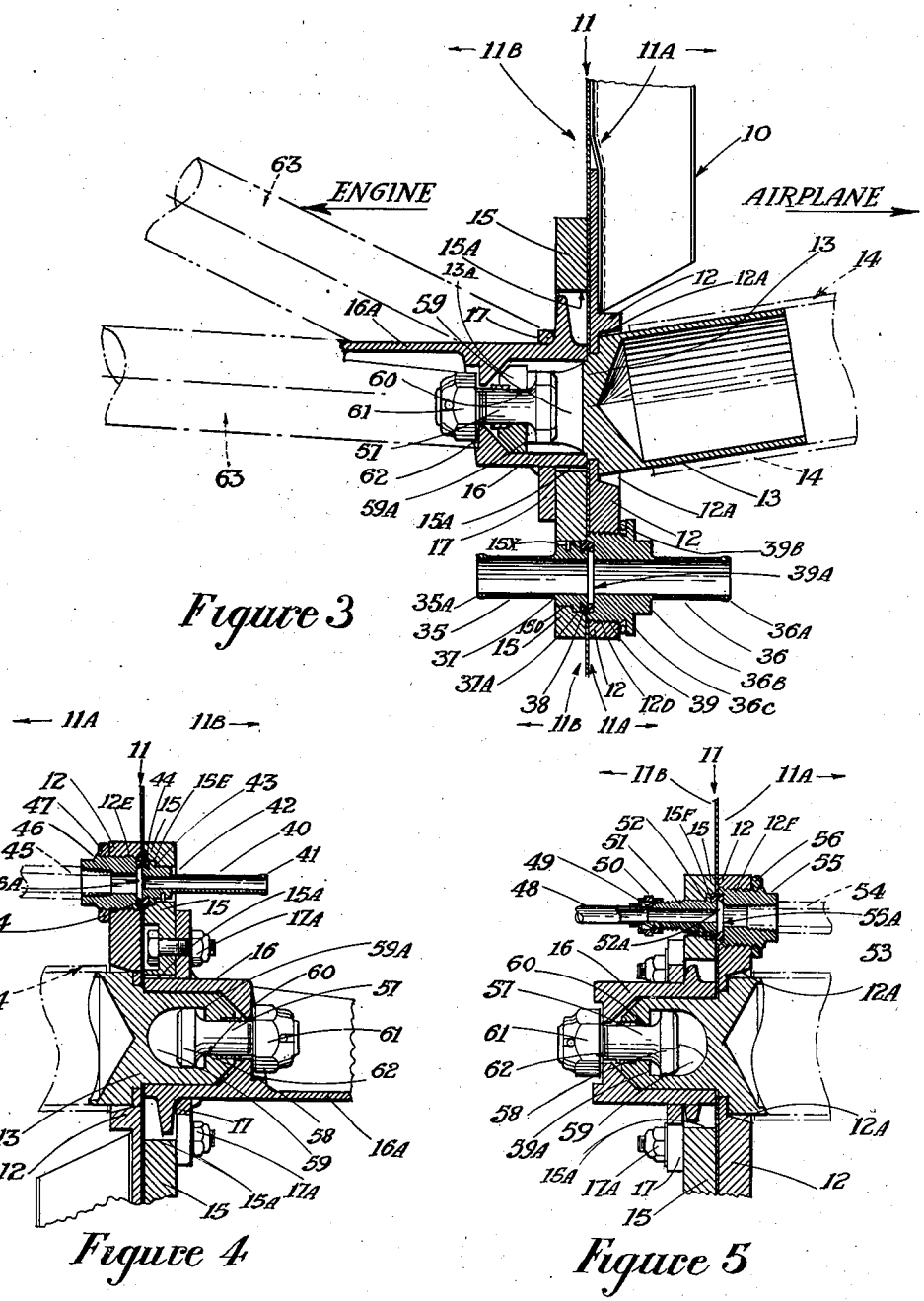
Figure 3 is a vertical section taken at 3—3 of Figure 1.
Figure 4 is a sectional plan taken at 4—4 in Figure 1, as viewed looking upward.
Figure 5 is a partial cross section taken at 5—5 in Figure 1.

Referring now to Figure 1, there is shown in dotted lines the engine firewall structure 10 and the broken lines designating the engine firewall sheet 11. Figure 2 shows on the face of the firewall 11A opposite the engine a plate fitting 12, attached to the airplane structure 10. This fitting 12 has a plurality of circular or annular openings, and a central counterbored or rabbeted opening 12A to receive the tongue portion 13 which forms a part of the shouldered fuselage structural member 14. The plate fitting 12 is also provided with annular threaded openings for the various tubular lines as hereinafter more fully described. These include a threaded annular opening 12B for a hydraulic pressure line 25; and a threaded opening 12C for an oil-to-engine line 32. There is also provided a threaded annular opening 12D for a vacuum line 36 as shown in Figure 3, a threaded annular opening 12E for a cowling flap hydraulic line 45 as shown in Figure 4 and a threaded annular opening 12F for a cowl flap hydraulic line 54 as shown in Figure 5.

Referring now to Figures 2, 3, 4, and 5, on the engine side of the firewall 11B there is provided a plate fitting 15 having a plurality of annular openings, such as the central offset opening 15A to receive the engine mount fitting 16, also the annular openings for the various tubular lines which are disposed directly opposite to matching openings in the plate fitting 15 for identical tubular lines on the opposite, or airplane, side of the firewall 11A. The engine mount fitting 16, retained in the offset opening 15a, is permanently attached by welding, or other means, to lugs 17 which in turn are bolted to plate fitting 15 by the bolts 17A, which with rabbeted or counterbored openings in plate fitting 15 retaining a plurality of tubular lines, results in a unitary assembly.

Referring again to Figure 2, the tubular line at the left, and on the engine side of firewall 11B, is a hydraulic pressure line 18 with a flared annular terminal 19 which is retained by sleeve 20. There is provided a projecting annular collar 21 threaded internally on one end to engage the threaded end of the bushing 22 which has a projecting flange 23 retained in a rabbeted or counterbored opening 15B in plate fitting 15. The projecting flange 23 retains a bushing 24 of rubber, or of a similar synthetic flexible material which seals the connection between the hydraulic line 18 on the engine side of firewall 11B and the corresponding hydraulic line 25 on the opposite, or airplane side, of the firewall 11A. The projecting annular threaded bushing 26, which is retained in threaded opening 12B in plate fitting 12, has a flared depressed seat 26A which forms the point of seal, rupture or breakage between the hydraulic lines 25 and 18. A hexagonal nut 27 with an annular internally threaded opening is threaded to the bushing 26 at the opening 12B in the plate fitting 12, to serve as a lock nut.

There is also shown at the right side of the sectional illustration in Figure 2, on the engine side of firewall 11B an oil-to-engine line 28 with a hose nipple end 28A, and a projecting annular collar 29 at base with an annular flange 30 retained in a counterbored opening 15C in plate fitting 15. The projecting annular flange 30 retains a bushing 31 of rubber, or other similar flexible material, which seals the connection between the oil-to-engine line 28 on the engine side of firewall 11B and the corresponding oil-to-engine line 32 on the opposite, or airplane side of firewall 11A. The oil-to-engine line 32 represents a hose nipple end 33 and a projecting threaded collar 34 which is engaged in an internally threaded opening 12C in plate fitting 12. This threaded collar 34 has a flared depressed seat 34B which forms the point of seal, rupture or breakage between the oil lines 34—28. A hexagonal nut 34A with an internally threaded opening is threaded to bushing 34 at opening 12C in plate fitting 12, and will permit adjustment of pressure on seal.

Referring to Figure 3, the tubular line at the bottom of the illustration, on the engine side of firewall 11B, may preferably be a vacuum line 35 with a hose nipple end 35A, a projecting annular collar 37 and a projecting flange 37A which is retained in a counterbored opening 15D in plate fitting 15. The flange at 37A at the base of the vacuum line 35 retains a bushing 38 of rubber, or a similar synthetic flexible material, which seals the connection between the vacuum line 35 on the engine side of firewall 11B and the vacuum line 36 on the airplane side of the firewall 11A. The vacuum line 36 is provided with a hose nipple end 36A, a collar 36B and a projecting annular flange 36C with a threaded annular portion 39, which is retained in the threaded opening 12D in plate fitting 12. This threaded portion 39 has a flared depressed seat which forms the point of seal rupture 39A, or breakage, between the vacuum lines 35 and 36. A copper asbestos gasket 39B is preferably provided between the projecting flange 36C of vacuum line 36 and the plate fitting 12 at the threaded annular opening 12D.

Figure 4 preferably indicates in the upper part of the sectional illustration, on the engine side of the firewall 11B, a cowl flap hydraulic line 40 with a hose nipple end 41 and a projected annular collar 42 and an additional projecting annular flange 43 retained in a rabbeted annular opening 15B in plate fitting 15. The projecting annular flange 43 at the base of the hydraulic line 40 retains a bushing 44 of rubber, or a similar synthetic flexible material, which seals the connection between the hydraulic line 40 on the engine side of the firewall 11B and the corresponding hydraulic line 45 on the airplane side of firewall 11A. The hydraulic line 45 has a projecting threaded annular bushing which is retained in the threaded opening 12E in plate fitting 12. This threaded bushing has a flared depressed seat which forms the point of seal rupture 46A, or breakage, between the hydraulic lines 40 and 45. A hexagonal nut 47 with an annular internally threaded opening is retained in the threaded bushing 46 at the opening 12E in plate fitting 12.

Referring to Figure 5, there is preferably indicated in the upper portion of sectional illustration on the engine side of the firewall 11B, a cowl flap hydraulic line 48 with flared annular terminal 49. This line is retained by an annular collar 50 threaded internally on one end to engage the threaded end of an annular bushing 51 which has a projecting annular flange 52 retained in a rabbeted annular opening 15F in plate fitting 15. The projecting annular flange 52 retains a bushing 52A of rubber, or a similar material, which seals the connection between the hydraulic line 48 on the engine side 11B of the firewall 11 and the corresponding hydraulic line 54 on the airplane side of firewall 11A. The hydraulic line 54 has a projected annular threaded bushing 55 which is retained in the threaded annular opening 12F in plate fitting 12. This bushing 55 has a flared depressed seat which forms the point of seal rupture 55A, or breakage, between hydraulic lines 48 and 54. A hexagonal nut 56 with an annular internally threaded opening is retained at the threaded bushing 55 at opening 12F in plate fitting 12. Bushings or projecting collars on tubular lines shown as including pipe threads may be made with hose nipple ends, triple seal type ends, straight threads, or other provision made for tube attachment. The tubular lines are not restricted to the number, size, use or type illustrated and described and may obviously vary for alternate assemblies.

Figures 8, 9:
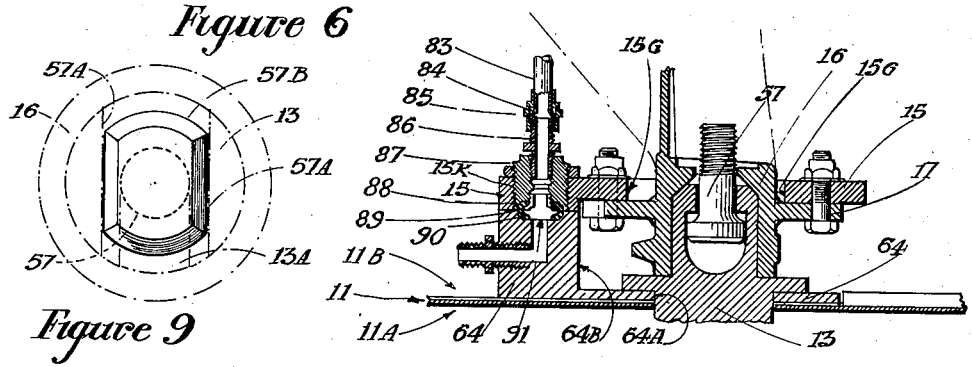
Figure 8 is a fragmental section taken at 8—8 in Figure 6.
Figure 9 is a plan view of a mounting bolt with surrounding structure shown in phantom view.

In Figures 1 to 5 inclusive there is shown at a central location in the fitting 12, the engine mount fitting 16 connected to aircraft fitting 13 and the structural member 14, with an annular bolt 57 having an integral flared four-sided head 58. The latter sets in an internal annular socket or recess 59, and the specially formed head 58 on the bolt 57 forms a seat 59A which retains bolt 57 within the socket 59. As shown in Fig. 9 the head has a perimeter defined by two opposed straight sides 57A and two opposed arcuate sides 57B. A flared annular ring located at the opening 60 within socket 59 forms a wedge for take up on the bolt 57 at the head 58 providing a means of eliminating movement between the connecting fittings 13 and 16 when nut 61 is tightened on the extended end of bolt or stud 57. A hexagonal threaded nut 61 sets in the annular depression or counterbore 62 in engine mount fitting 16 engaging the threaded ends of bolt 57, thereby securing the engine mount fitting and structural fitting 13 against relative movement. The extended lug portion 17 of engine mount fitting 16 is connected by welding, or other means, to engine mount structure 63 indicated in dotted lines in Figures 1 and 3.

The removal of the hexagonal nut 61 from the engine mount support bolt 57 allows all lines and engine mount support and fittings to be disconnected simultaneously as a unit, each of the tubular lines breaking at its seal. Furthermore, the threaded bushing 26 as well as the corresponding bushings for the remaining conduits are each individually removable so that the associated coupling can be completely removed without requiring the disassembly of the couplings or the removal of the engine mount bolts. This allows replacement of the seal, changing of the type of coupling or changing of the fitting. Each individual coupling installation includes a drain groove similar to 15X in Fig. 2 whereby any leakage at the seat is allowed to appear at the exposed face of the fitting. Thus it is possible to immediately determine the presence of leakage in any of the lines through the fitting as well as to determine which of the lines is not properly sealed.

Figure 6:
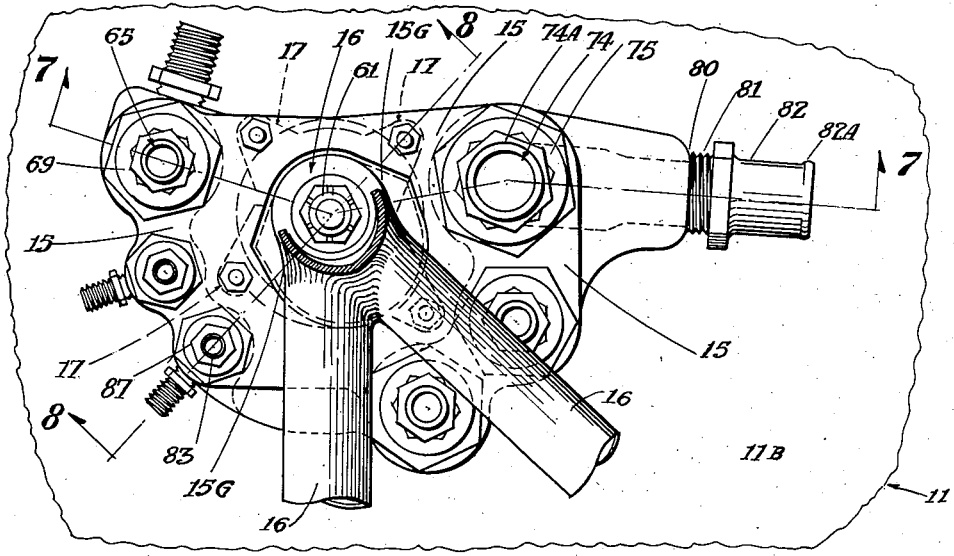
Figure 6 is an elevational view of an alternate form of a combined mounting assembly at an engine firewall as viewed from the engine side.
Figure 7:
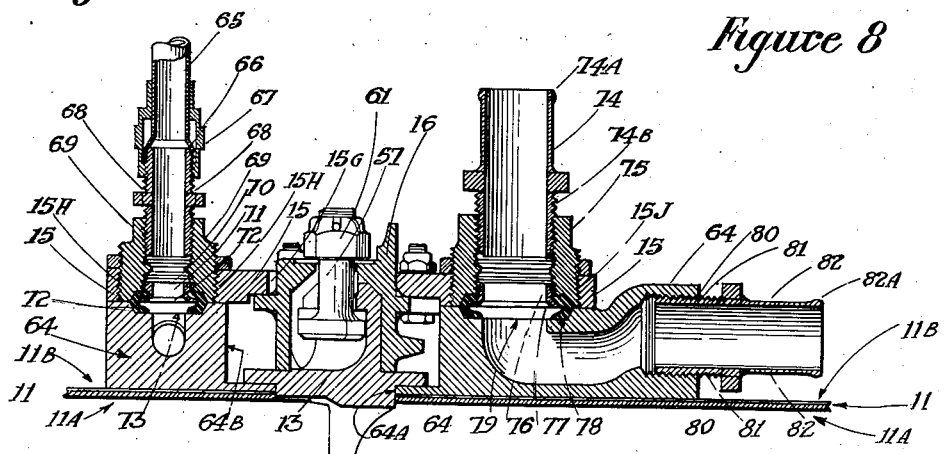
Figure 7 is a cross-section taken at 7—7 in Figure 6 showing the method of attaching the engine mount fitting and the method of providing a tubular line parallel to the engine firewall.

Referring to Figs. 6, 7 and 8 there is indicated an alternate combined assembly of tubular lines and engine mount fitting 16 at the engine firewall 11. In these figures there is shown a plurality of tubular lines certain of which branch off from the fitting 16 in various directions on the engine side of the firewall, and parallel thereto. This modification differs from that in Figures 1 to 5 inclusive which indicates the tubular lines passing directly through the firewall. On the engine side of firewall face 11B there is provided the fitting 64 having an annular opening 64A to receive the structural fitting 13, as well as a larger counterbored opening 64B to receive the engine mount fitting 16. In addition there is provided a plurality of openings which lead in an elbow fashion parallel to the firewall to openings at ends of fitting 64 directing a plurality of tubular lines within a plane parallel to the firewall in a number of directions as shown. Applied to the fitting 64 is a matching plate fitting 15 with a like number of openings aligned with the centers of the corresponding openings in the base fitting 64. The offset opening 15G in plate fitting 15 is provided for the engine mount fitting 16 which has lugs 17 permanently attached by welding or other means. These lugs in turn are bolted to plate fitting 15 which is provided with rabbeted or threaded openings in the plate body of fitting 15, retaining a plurality of tubular lines resulting in a unitary assembly.

Referring to Figure 7 at the left of the sectional illustration, there is shown a tubular line 65 with a flared annular collar 66 which is retained by the collar 67 threaded internally on one end to engage the threaded pipe section 68 which is retained in a projecting internally threaded bushing 69. This bushing 69 is also externally threaded and retained in an internally threaded opening 15H in plate fitting 15. A threaded fitting 70 with an extended annular flange 71 retains a bushing 72 of rubber, or the like, which seals the connection between the tubular line 65 and corresponding opening 73 in fitting 64.

There is also shown at the right of Figure 7 a tubular line 74 with a hose nipple end 74A, and a threaded bushing 75. This latter bushing is externally threaded and retained in an internally threaded opening 15J in plate fitting 15. A threaded annular fitting 76 with an extended flange 77 retains a bushing 78 of rubber, or the like, which seals the connection between the tubular line 74 and the corresponding annular opening 79 in fitting 64. The annular opening 79 is elbow shaped and diverted laterally slightly inwardly to an internally threaded terminus 80 which retains an internally threaded bushing 81 at the pipe or tube 82 having a hose nipple end 82A.

Figure 8 indicates at its left side in section a tubular line 83 with a flared annular terminal 84 retained by annular collar 85 to a threaded bushing 86, and threaded projecting bushing 87. The latter is externally threaded and maintained in an internally threaded opening 15K in plate fitting 15. A threaded annular fitting 88 with an extended flange 89 retains a bushing 90 of rubber, or the like, which seals the connection between the tubular line 83 and the corresponding annular opening 91 in fitting 64. At opening 91 in fitting 64 there is a flared depressed seat which is the point of seal rupture or break between the tubular line 83 and opening 91 in fitting 64. Opening 91 extends downwardly and outwardly through an elbow to the end of fitting 64. In the modification shown the stud 57 is retained within the fitting 13 by the walls of the latter being swaged over or suitably upset, the threaded end of the stud shank extending toward the engine mount structure. However, at one point in the periphery of the swaged-over portion, a gap 13A is formed to allow insertion or removal of the stud (see Fig. 9). It will be noted that the present combined structural and fluid tubing or piping fitting comprises essentially two plate elements, one of which, 12, is attached to the firewall portion 11 of the fuselage structure 10 and receives the extended tubular fitting 13 of the fuselage structure and the captive stud for the engine mount attachment. The combined fitting includes the matching or mating plate 15 which forms the other half of the structural and fluid connection, being attached to the first plate through its attachment to the engine portion of the structure which in turn is detached by the single nut 61 engaging the threaded end of the stud 57. The latter is preferably centrally or substantially centrally disposed, as shown in the figures, within the group of fluid connections which, of course, may vary in size and arrangement to accommodate fluids as required.

The combined engine mount and fluid attachment fitting of the present invention is readily adapted to use with engine mounts of the resilient bushings or other elements of such mounts would preferably be disposed on the engine side of the present fitting or the adjacent firewall although this invention is not to be limited to use either with or without such resilient elements, or as to their specific location. It will also be obvious that each engine in aircraft installations would be attached to the fuselage or wing nacelle structure by a plurality of such structural attachment fittings and these installations might include one of the combined attachments described herein or each of the attachments may be of the presently described type. Other forms and modifications of the present invention, both with respect to its general arrangement and the details of its respective elements which may become apparent or obvious to those skilled in the art after a reading of the present specification and the accompanying drawings, are to be considered to come within the scope and spirit of the present invention as more particularly defined by the following claims.

I claim:

1. In an aircraft engine installation, a fuselage structural element, an engine mount structural element, a transverse fire-wall member having a plurality of openings therein intermediately disposed between said fuselage and engine mount structural elements, connecting means comprising a pair of plate elements each provided with a plurality of matching openings similarly spaced with respect to the openings in the other said plate and the openings in said fire-wall member to form coinciding openings therethrough, conduits arranged for the transmission of fluid through said matching plate elements and said fire-wall member, a portion of each said conduit removably mounted in one of a pair of the said matching openings in the respective plate elements, and fastening means extending through further matching openings in said plate elements and said fire-wall member, said fastening means arranged for the support of said engine mount structural element from said fuselage structural element and also the support of said plate elements in their matching relationship on opposite sides of said fire-wall member, said fluid conduits being disconnected simultaneously with the separation of said engine mount structural element from said fuselage structure upon detachment of said fastening means.

2. In an aircraft engine installation, a fuselage support element, an engine mounting element, a transverse fire-wall member having a plurality of spaced openings therethrough, said fire-wall member disposed intermediate said fuselage support and engine mounting elements, a detachable mounting assembly comprising a pair of plate elements each provided with a plurality of matching openings similarly spaced with respect to the openings in the other plate element and the openings in said fire-wall member to form coinciding openings therethrough, a pair of aligned conduits arranged for transmission of fluid transversely through a series of said coinciding openings in said matching terminal elements and said fire-wall member, at least one of said fluid conduits removably mounted in one of said matching openings in its respective plate element, and fastening means extending through further matching openings in said plate elements and said fire-wall member arranged for the support of said engine mounting element from said fuselage support element and for the support of said plate elements in their matching relationship on each side of the said fire-wall member, said matching openings having substantially parallel axes arranged such that said fluid couplings are disconnectable simultaneously with the same separating movement of said engine mounting element from said fuselage support element upon detachment of said fastening means.

3. The combination in an aircraft engine installation of a fire-wall member having spaced openings therethrough, a pair of plate elements each provided with a plurality of matched openings similarly spaced with respect to the openings in the other said plate element and the openings in said fire-wall member to form a plurality of aligned openings therethrough, a conduit threadedly engaging an opening in a first of said plate elements, a second conduit threadedly engaging an aligned opening in said second plate element, at least one of said conduits being individually removable from its respective aligned opening in the said plate element through its threaded engagement therewith, and attachment means extending through a further series of aligned openings in said plate elements and said fire-wall member for connecting said plate elements in their matching relationship contiguous to said fire-wall member in such manner that disconnection of said attachment means and separation of said matching plate elements accomplishes simultaneous opening of said aligned conduits.

4. The combination in an aircraft engine installation of a fire-wall member having a plurality of spaced openings extending therethrough, a pair of matching plate elements adapted to be mounted upon the opposite sides of said fire-wall member adjacent its said openings, each said plate element provided with a plurality of openings similarly spaced with respect to the openings in the other said plate element and the openings in said fire-wall member to provide matching openings therethrough, a plurality of conduits arranged for the transmission of fluid through the several matching openings in said plate elements and said fire-wall member, a portion of each said fluid conduit removably mounted in at least one of each pair of oppositely matching openings in the respective plate elements, and attachment means extending through further matching openings in said plate elements and said fire-wall member arranged for supporting said plate elements in their matching relationship on opposite sides of said fire-wall member, said fluid conduits being disconnectable jointly upon separation of said matching plate elements and a portion of each said conduit removable individually exteriorly of its respective plate element in the attached relationship of said plate elements.

5. The combination of a supporting structural element having an extending tongue portion, a supported structural element having a socket portion adapted to telescopically engage said tongue portion, a transverse wall member having a plurality of spaced openings extending therethrough supported from said telescopically engaged tongue and socket portions of the said structural elements, a pair of matching plate elements similarly provided with a plurality of spaced openings therethrough arranged for mounting upon the opposite sides of said wall member, each said plate element provided with a plurality of openings similarly spaced with respect to the openings in the other said plate elements and the openings in said supporting structure to provide matching openings therethrough, a pair of aligned conduit portions arranged for the transmission of fluid through a series of the said matching openings in said plate elements and in said wall member, and attachment means arranged for releasable engagement with said tongue portion for the support of said plate elements and said wall member in their said matching relationship, said fluid conduit portions being separable jointly upon separation of said matching plate elements by the release of said attachment means and at least one of said conduit portions being separable individually exteriorly of its respective plate elements.

6. The combination set forth in claim 5 characterized by the provision of annular seal means disposed between said matching plate elements and said conduit portions arranged for preventing leakage of fluid into the transverse spaces between said plate elements and said wall member, and a drain passage extending from the exterior of said seal to the exterior of said plate element for the indication of fluid leakage past said seal without the necessity of removing said conduit portion from its respective plate element.

CHAS. E. PATTERSON.

REFERENCES CITED

The following references are of record in the file of this patent:

UNITED STATES PATENTS

| Number | Name | Date |
|---|---|---|
| 506,842 | Burke | Oct. 17, 1893 |
| 1,581,539 | Kauch et al. | Apr. 20, 1926 |
| 1,645,964 | Mummert | Oct. 18, 1927 |
| 1,648,875 | Griese | Nov. 8, 1927 |
| 1,892,065 | Markey | Dec. 27, 1932 |
| 1,920,598 | Schirmer | Aug. 1, 1933 |
| 2,074,533 | Bicusa | Mar. 23, 1937 |
| 2,099,490 | Larsson | Nov. 16, 1937 |
| 2,108,307 | Da Valle | Feb. 15, 1938 |
| 2,192,893 | Butler | Mar. 12, 1940 |
| 2,379,315 | Moorehead | June 26, 1945 |